(12) United States Patent
Song et al.

(10) Patent No.: US 7,070,201 B2
(45) Date of Patent: Jul. 4, 2006

(54) LOW RISK DEPLOYMENT PASSENGER AIRBAG SYSTEM

(75) Inventors: Seung-Jae Song, Novi, MI (US); Miyoung Jang, Novi, MI (US)

(73) Assignee: CIS Tech, LLC, Novi, MI (US)

( * ) Notice: Subject to any disclaimer, the term of this patent is extended or adjusted under 35 U.S.C. 154(b) by 7 days.

(21) Appl. No.: 10/909,581

(22) Filed: Aug. 2, 2004

(65) Prior Publication Data
US 2005/0269808 A1 Dec. 8, 2005

Related U.S. Application Data

(60) Provisional application No. 60/577,569, filed on Jun. 7, 2004, provisional application No. 60/581,919, filed on Jun. 22, 2004.

(51) Int. Cl.
*B60R 21/16* (2006.01)
(52) U.S. Cl. .................................................. 280/730.1
(58) Field of Classification Search ............. 280/730.1, 280/732, 728.2, 740, 735
See application file for complete search history.

(56) References Cited

U.S. PATENT DOCUMENTS

| | | | |
|---|---|---|---|
| 2,834,606 A | 5/1958 | Bertrand | |
| 3,610,657 A | 10/1971 | Cole | 280/150 AB |
| 3,642,303 A | 2/1972 | Irish et al. | 280/150 AB |
| 3,664,682 A | 5/1972 | Wycech | |
| 3,767,225 A | 10/1973 | Mazelsky | 280/150 A |
| 3,784,225 A | 1/1974 | Fleck et al. | 280/150 AB |
| 3,819,204 A | 6/1974 | Oka et al. | 280/150 AB |
| 4,043,572 A | 8/1977 | Hattori et al. | 280/738 |
| 4,169,613 A | 10/1979 | Barnett | 280/732 |
| 4,290,627 A | 9/1981 | Cumming et al. | 280/729 |
| 4,360,223 A | 11/1982 | Kirchoff | 280/729 |
| 5,240,283 A | 8/1993 | Kishi et al. | 280/729 |
| 5,310,214 A | 5/1994 | Cuevas | 280/729 |
| 5,480,184 A | 1/1996 | Young | 280/731 |

(Continued)

FOREIGN PATENT DOCUMENTS

DE  43 04 152 A1  8/1993

(Continued)

*Primary Examiner*—Faye M. Fleming
(74) *Attorney, Agent, or Firm*—Gifford, Krass, Groh, Sprinkle, Anderson & Citkowski, PC (57) ABSTRACT

A low risk deployment passenger airbag system has two separate airbags, a top-mounted airbag and a mid-mounted airbag. The top-mounted airbag deploys into the adult occupant's head and upper torso areas without generating substantial downward deployment, while the mid-mounted airbag deploys into the adult occupant's lower torso area without generating substantial upward deployment. This mode of substantially horizontal deployments can provide an out-of-position child with a safe mode of airbag inflation, reducing the risk of neck injuries. An infant in a rear facing child seat receives distributed small forces from two airbags with a possible time delay in initial airbag contact rather than a concentrated large force from the conventional single passenger airbag. The total capacity of the two airbags is about the same as the conventional single passenger airbag and thus can provide as effective protection. The top-mounted airbag has a larger capacity in volume than the mid-mounted airbag and serves as a main airbag for protecting in-position occupants. The mid-mounted airbag may be deployed at low output or no output level for belted occupants during high-speed crashes, which in turn can help reduce the injury values of an infant dummy in a rear facing child seat during the low risk deployment test.

30 Claims, 7 Drawing Sheets

U.S. PATENT DOCUMENTS

| | | | |
|---|---|---|---|
| 5,513,877 A | 5/1996 | Mac Brien et al. | 280/732 |
| 5,558,300 A | 9/1996 | Kalberer et al. | 244/121 |
| 5,577,765 A | 11/1996 | Takeda et al. | 280/729 |
| 5,752,715 A | 5/1998 | Pripps et al. | 280/740 |
| 5,775,729 A | 7/1998 | Schneider et al. | 280/730.1 |
| 5,775,730 A | 7/1998 | Pripps et al. | 280/729 |
| 5,803,485 A | 9/1998 | Acker et al. | 280/728.2 |
| 6,059,312 A | 5/2000 | Staub et al. | 280/729 |
| 6,095,273 A | 8/2000 | Aboud et al. | 180/90 |
| 6,158,765 A | 12/2000 | Sinnhuber | 280/728.3 |
| 6,209,908 B1 | 4/2001 | Zumpano | 280/729 |
| 6,213,496 B1 | 4/2001 | Minami et al. | 280/729 |
| 6,224,088 B1 | 5/2001 | Lohavanijaya | 280/728.2 |
| 6,276,716 B1 | 8/2001 | Kato | 280/735 |
| 6,431,583 B1 | 8/2002 | Schneider | 280/728.2 |
| 6,431,586 B1 | 8/2002 | Eyrainer et al. | 280/730.1 |
| 6,505,851 B1 | 1/2003 | Frisch | 280/728.3 |
| 6,513,829 B1 | 2/2003 | Zumpano | 280/730.1 |
| 6,523,855 B1 | 2/2003 | Musiol et al. | 280/729 |
| 6,536,799 B1 | 3/2003 | Sinnhuber et al. | 280/735 |
| 6,616,177 B1 | 9/2003 | Thomas et al. | 280/729 |
| 6,676,147 B1 * | 1/2004 | Ozaki et al. | 280/240 |
| 6,679,522 B1 | 1/2004 | Igawa | 280/743.1 |
| 6,702,322 B1 | 3/2004 | Eyrainer et al. | 280/730.1 |
| 6,709,009 B1 | 3/2004 | Michael et al. | 280/729 |
| 6,836,715 B1 * | 12/2004 | Sakai et al. | 701/45 |
| 2002/0001774 A1 | 1/2002 | Je et al. | 430/270.18 |
| 2002/0005633 A1 | 1/2002 | Amamori | 280/729 |
| 2002/0020990 A1 | 2/2002 | Sinnhuber et al. | 280/729 |
| 2002/0024200 A1 | 2/2002 | Eckert et al. | 280/730.1 |
| 2002/0109341 A1 | 8/2002 | Eckert et al. | 280/743.1 |
| 2002/0125690 A1 | 9/2002 | Boll et al. | 280/730.1 |
| 2002/0185845 A1 | 12/2002 | Thomas et al. | 280/729 |
| 2003/0015861 A1 | 1/2003 | Abe | 280/730.1 |
| 2003/0030254 A1 | 2/2003 | Hasebe | 280/729 |
| 2003/0034637 A1 | 2/2003 | Wang et al. | 280/729 |
| 2003/0034638 A1 | 2/2003 | Yoshida | 280/729 |
| 2003/0034639 A1 | 2/2003 | Amamori | 280/729 |
| 2003/0094794 A1 | 5/2003 | Amamori | 280/729 |
| 2003/0116945 A1 | 6/2003 | Abe | 280/729 |
| 2003/0218319 A1 | 11/2003 | Amamori | 280/729 |
| 2004/0026904 A1 | 2/2004 | Yamazaki et al. | 280/729 |
| 2004/0026909 A1 | 2/2004 | Rensinghoff | 280/732 |
| 2004/0046369 A1 | 3/2004 | Michael et al. | 280/729 |
| 2004/0046370 A1 | 3/2004 | Reiter et al. | 280/729 |
| 2004/0090050 A1 | 5/2004 | Dominissini et al. | 280/730.1 |
| 2004/0100073 A1 | 5/2004 | Bakhsh et al. | 280/730.1 |
| 2004/0100074 A1 | 5/2004 | Bakhsh et al. | 280/730.1 |

FOREIGN PATENT DOCUMENTS

| | | |
|---|---|---|
| JP | 011 32 444 A | 5/1989 |
| JP | 3-112748 | 5/1991 |
| JP | 051 39 232 A | 6/1993 |
| JP | 2000168486 A | 6/2000 |

* cited by examiner

LOW RISK DEPLOYMENT PASSENGER AIRBAG SYSTEM

REFERENCE TO RELATED APPLICATIONS

This application claims priority from U.S. Provisional Patent Application Ser. Nos. 60/577,569, filed Jun. 7, 2004 and 60/581,919, filed Jun. 22, 2004, the entire content of both applications are incorporated herein by reference.

FIELD OF THE INVENTION

This invention relates to a passenger airbag system for use with a motor vehicle. More specifically, two airbags are mounted separately in the instrument panel in such a way as to minimize the risk of injuries caused by airbag inflation to out-of-position occupants while maintaining as effective protection for in-position occupants during serious crashes as a conventional single airbag.

BACKGROUND OF THE INVENTION

Front driver and passenger airbags have saved numerous lives and reduced injuries from severe frontal crashes. These airbags have been proven to work effectively on the roads for both belted and unbelted occupants, even though they are supplementary devices to safety belts. They are designed to absorb kinetic energy during crashes in such a way that the occupant decelerates smoothly by cushioning from the inflated airbags.

In order for the airbags to protect the occupants properly, the airbags should be fully inflated fast enough to be in position in front of the occupants during the crash. However, this fast inflation sometimes causes serious injuries to the occupants, especially to out-of-position occupants. For example, the occupant can move forward and get very close to the airbag during emergency braking before the crash, and then can be injured or killed by the fast-inflating airbag. Infants riding in a rear facing child seat (RFCS), children, and small size adults are more vulnerable to the risks.

The National Highway Traffic Safety Administration (NHTSA), a government agency, has proposed a rulemaking that sets a new performance requirement and test procedures for advanced airbag systems. The intent of this rulemaking is to minimize risks caused by air bags to out-of-position occupants, especially infants and children, and also to improve occupant protection provided by airbags for belted and unbelted occupants of all sizes. The new rule for advanced airbags applies to about 20 percent of 2004 model year vehicles and all applicable vehicles of 2007 model year and afterward.

The advanced airbag rule, in part, requires as an option to conduct low risk deployment (LRD) airbag tests with a 12-month-old infant dummy in a rear facing child seat, and dummies representing 3 and 6 year old children. If the dummies from the airbag deployment tests do not meet the injury criteria limits set by NHTSA, vehicle manufacturers can choose another option of suppressing the airbag when infants or children are present. This airbag suppression option, however, may not provide the benefits of airbag protection for infants and children. An occupant classification sensing system is currently used in order to detect the presence of infants and children, and thus suppress the airbag accordingly. However, this occupant classification sensing system not only adds cost to a vehicle, but can also lead to reliability problems.

There have been a number of prior art attempts to reduce the injuries caused by airbag inflation to a level that can meet the low risk deployment option. The prior art attempts have employed multiple chambers in a single airbag, a bag inside another bag, different ways of airbag deployment, different ways of airbag folding, different power splits between two chambers in a dual chamber inflator, etc. To date, however, none of these technologies has proven to work reliably enough to reduce the injuries of small children and infants in rear facing child seats to a level that can meet the injury criteria of the low risk deployment option while also protecting in-position adults during serious crashes. The neck, among an occupant's body parts, is especially vulnerable to serious injuries exceeding the injury criteria limits set by the regulation.

SUMMARY OF THE INVENTION

The objectives of the present invention are therefore 1) to develop a front passenger airbag system that can minimize the risks of injuries caused by airbags to out-of-position infants and children to a level that can meet the stringent government regulation of the low risk deployment option, and 2) to improve the protection of occupants of all sizes during both low and high-speed crashes.

According to one aspect of the invention, a passenger airbag system is provided for an automotive vehicle having a passenger compartment, a windshield, and an instrument panel disposed between the passenger compartment and windshield. The passenger airbag system includes a top-mounted airbag and a mid-mounted airbag. Both airbags are deployable through the instrument panel along a predetermined path for direct contact with an occupant seated in the passenger compartment. The predetermined path is substantially horizontal.

According to another aspect of the invention, the top-mounted airbag after deployment has a volume substantially larger than the mid-mounted airbag.

According to another aspect of the invention, the top-mounted airbag after deployment is presented between a top surface of the instrument panel, the windshield and the mid-mounted airbag for direct contact with the occupant.

According to another aspect of the invention, the mid-mounted airbag after deployment is presented below the top-mounted airbag for direct contact with the occupant.

According to another aspect of the invention, a passenger airbag system is provided for an automotive vehicle having a passenger compartment, a windshield, and an instrument panel disposed between the passenger compartment and windshield. The passenger airbag system includes a top-mounted airbag and a mid-mounted airbag. Both of the airbags are deployable through the instrument panel for direct contact with an occupant seated in the passenger compartment. The deployment of at least one of the airbags during high speed crashes is controlled in accordance with an algorithm that defines a predetermined lower output level for the deployment of the at least one of the airbags when it is determined that the occupant is restrained by a safety belt in the occupant compartment.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE DRAWINGS

Figure 1:
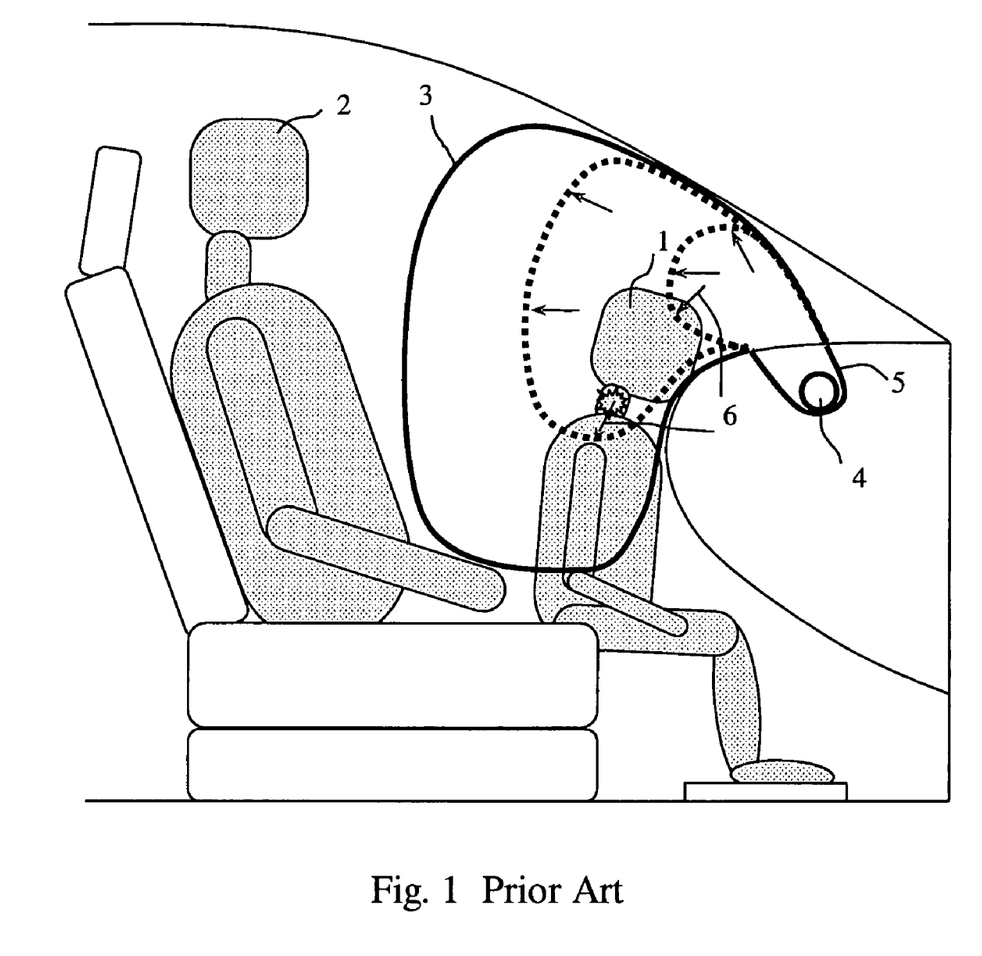
FIG. 1 is a side elevational view of a conventional top-mounted passenger airbag with an out-of-position child dummy and an in-position adult male dummy.

Referring to FIG. 1, a conventional single passenger airbag module is shown top-mounted in the instrument panel. The airbag cushion 3 deploys toward the head and torso areas of an adult occupant 2. During the airbag deployment, shown as a dotted line, the airbag can generate a substantially large component of downward deployment, as indicated by the arrows at 6. The component of downward deployment 6 can now push down the head of the out-of-position child 1 and potentially cause a serious injury to the neck. The airbag module has a gas generating inflator 4, and a housing 5 that holds the inflator 4 and airbag cushion 3.

Figure 2:
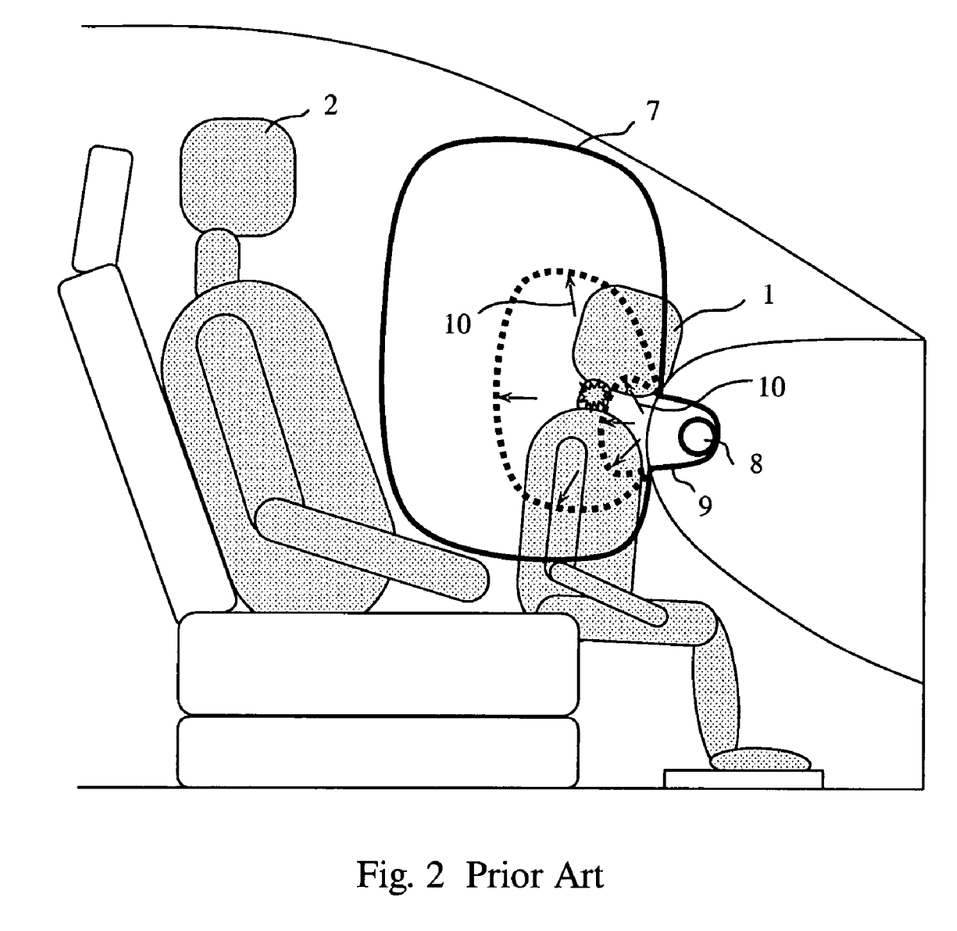
FIG. 2 is a side elevational view of a conventional mid-mounted passenger airbag with an out-of-position child dummy and an in-position adult male dummy.

FIG. 2 shows another conventional single passenger airbag module that is mid-mounted in the instrument panel. The airbag module includes an airbag cushion 7, which deploys toward the head and torso areas of an adult occupant 2. During the airbag deployment, shown as a dotted line, the airbag 7 can generate a substantially large component of upward deployment, as indicated by the arrow 10, and can be trapped under the chin of an out-of-position child 1. The component of upward deployment 10 can now push up the chin and potentially cause a serious injury to the neck. The airbag module also includes a gas generating inflator 8, and a housing 9 that holds the inflator 8 and the airbag cushion 7.

Figure 3:
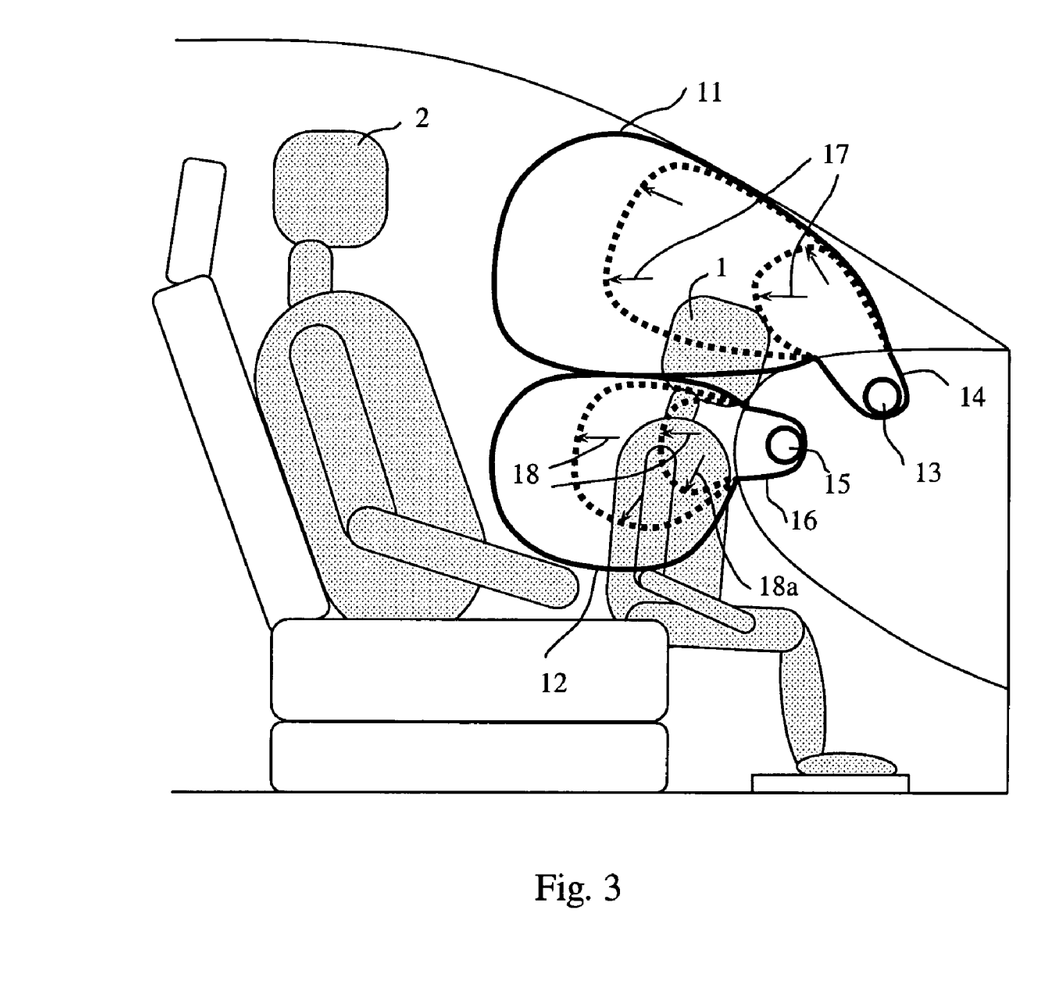
FIG. 3 is a side elevational view of one embodiment of the present invention shown with an out-of-position child dummy and an in-position adult male dummy.

FIG. 3 discloses a preferred embodiment of the present inventive airbag system as utilized on the passenger side of the vehicle. The airbag system includes a top-mounted airbag 11, which is mounted behind a generally horizontal top surface of the instrument panel. The top-mounted airbag 11 deploys toward the head and upper torso area of an adult occupant 2. Initially, the top-mounted airbag 11 deploys obliquely upward toward and along the windshield. When the top-mounted airbag 11 expands further, its progress toward the head and neck region of the out-of-position child 1 is substantially horizontal, as indicated by arrow 17, and thus does not generate a component of substantial downward deployment, unlike the single, conventional, top-mounted airbag 3 in FIG. 1, which reduces the risks of neck injuries.

The airbag system also includes a mid-mounted airbag 12, which is mounted behind a generally upright, occupant-facing surface of the instrument panel. The mid-mounted airbag 12 deploys toward the lower torso area of the adult occupant 2. The mid-mounted airbag 12 deploys generally horizontally, as indicated by the arrow 18, and downwardly, as indicated by the arrow 18a, and thus does not generate a component of substantial upward deployment, unlike the single, conventional, mid-mounted airbag 7 in FIG. 2, reducing the risks of neck injuries. Together, the mode of the horizontal deployments of the top-mounted airbag 11 and the mid-mounted airbag 12 can provide the out-of-position child with a safer mode of airbag deployment.

The sizes of both airbags 11, 12 of the present inventive airbag system are substantially smaller than the size of the conventional single passenger airbag 3 or 7. This helps distribute impact forces to the out-of-position child during airbag inflations. Preferably, the top-mounted airbag cushion 11 is substantially larger than the mid-mounted airbag cushion 12 in volume when fully deployed since the top-mounted airbag is less aggressive than the mid-mounted airbag due to a fact that the top-mounted airbag is located further away from the out-of-position occupant. The top-mounted airbag cushion 11 could have a deployed volume ranging between 60 and 120 liters, while the mid-mounted airbag cushion 12 could have a deployed volume ranging between 30 and 70 liters. In some embodiments, the top-mounted air bag has a volume at least 25 percent greater than the volume of the mid-mounted airbag. In other embodiments, the volume of the top-mounted air bag may be at least 50 percent greater than the volume of the mid-mounted airbag. In yet further embodiments, the top-mounted airbag may have a volume that is at least 75 or 100 percent greater than the volume of the mid-mounted airbag.

In use, the top-mounted 11 with mid-mounted 12 airbags are inflated by separate gas generating inflators 13 and 15, respectively. The inflators 13, 15 can be of any suitable type known in the art. In response to an existence of a predetermined set of factors, the inflators 13, 15 are triggered to inflate the airbags 11, 12 independently to each other.

Figure 4:
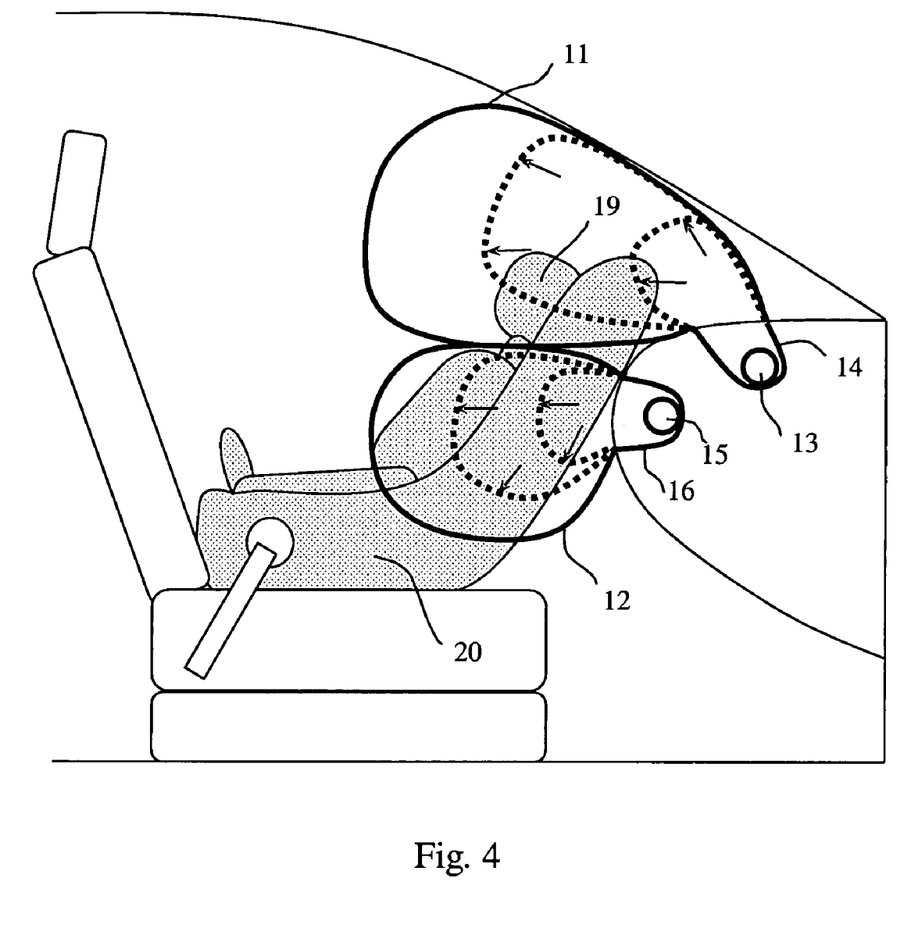
FIG. 4 is a side elevational view of an embodiment of the present invention with an infant dummy seated in a rear facing child seat during a standard low risk deployment test.

In FIG. 4, the deployments of the top-mounted 11 and mid-mounted 12 airbags of FIG. 3 are now shown with an infant 19 in a rear facing child seat 20 belted conventionally to the vehicle seat. The top-mounted airbag cushion 11 deploys toward the head area of the child seat 20, while the mid-mounted airbag cushion 12 deploys toward the thoracic region of the child seat 20.

As shown in FIG. 4, the airbags 11, 12 can be inflated to contact the child seat 20 in a slightly sequential manner. To ensure the desired relative timing between the airbags 11, 12 and the child seat 20, it may be necessary to offset the firing of the inflators 13, 15. Whether to offset the firing of the inflators 13, 15 will largely depend on such factors as: the size and type of inflators, size and material of each of the airbags, relative fore and aft position of the airbags, and the design and material of the airbag doors and/or tear seams.

Since the impact is now distributed into multiple parts of the child seat 20 with a possible time delay, the peak injury values of the infant in the child seat 20 can be reduced from those of conventional single airbag systems known in the art.

Figure 5:
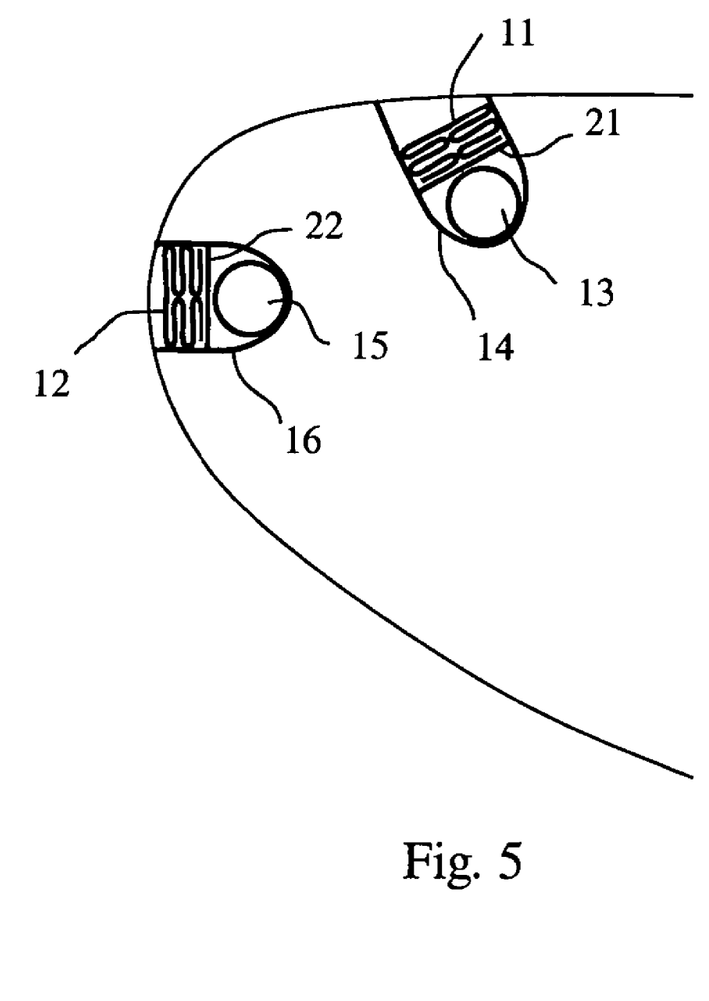
FIG. 5 is a cross sectional view of a preferred embodiment of the present invention having two separate airbag modules.

FIG. 5 shows a preferred embodiment of the present invention, wherein each airbag module has a separate inflator 13, 15. The parts of the top-mounted airbag module, such as the inflator 13, housing 14, and cushion 11 are smaller than those of top-mounted conventional single airbag, as shown in FIG. 1. Similarly, the parts of the mid-mounted airbag module, such as the inflator 15, housing 16, and cushion 12, are smaller than those of the mid-mounted conventional single airbag, as shown in FIG. 2. The airbag modules can have diffusers 21, 22 to control the output from the inflators 13, 15 into the respective airbag cushions 11, 12. It is preferable that the two airbags 11, 12 are controlled separately in regards to the firing time and the output level of the inflators 13, 15.

Figure 6:
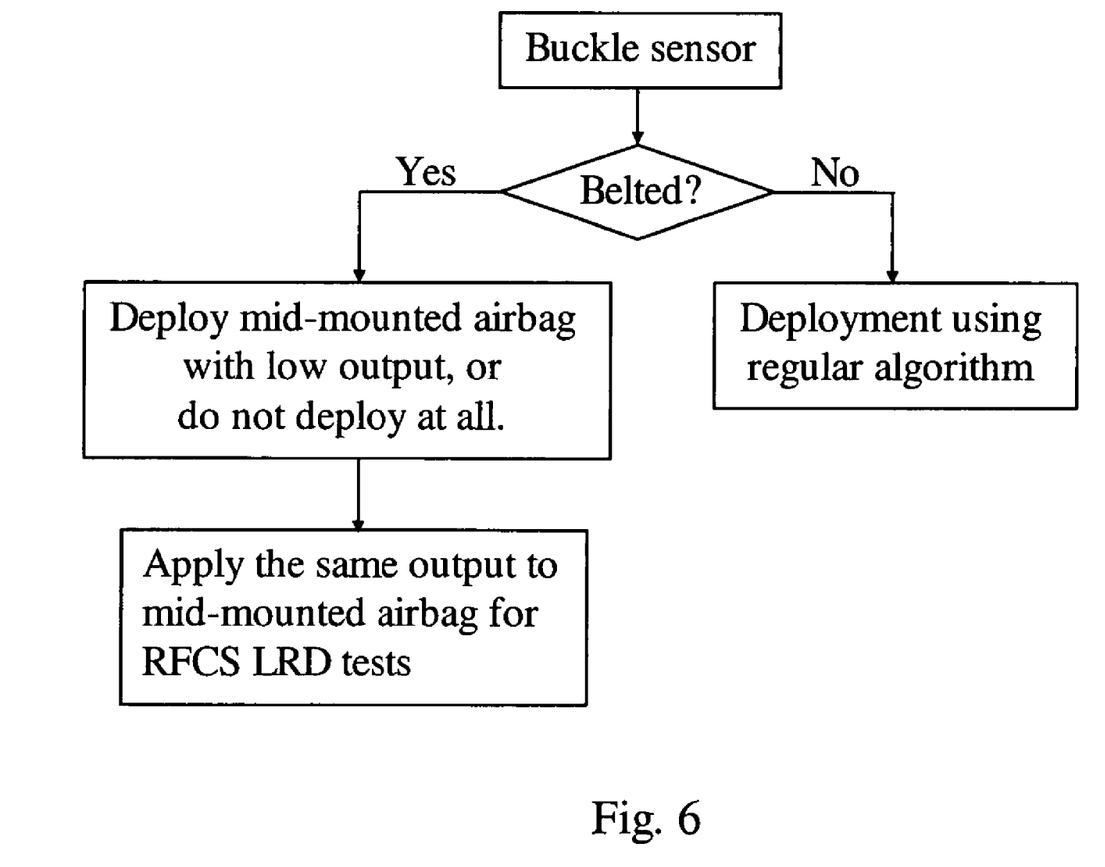
FIG. 6 illustrates an airbag deployment algorithm that can be used to control the mid-mounted airbag output for belted occupants during high-speed crashes.

FIG. 6 shows a flow chart of an optional airbag deployment algorithm for the preferred embodiment shown in FIG. 5. The mid-mounted airbag may be deployed at low output or may not be deployed at all for belted occupants during high-speed crashes including a 40 mph flat frontal rigid barrier test, a test in which a vehicle is crashed head-on into a flat rigid wall with 100% overlap with the vehicle's front structure, since the safety belt can be effective enough to restrain the occupant's torso and pelvis. This reduced inflation output to the mid-mounted airbag 12 can help reduce injury values of an infant dummy in a rear facing child seat during the low risk deployment test.

Figure 7:
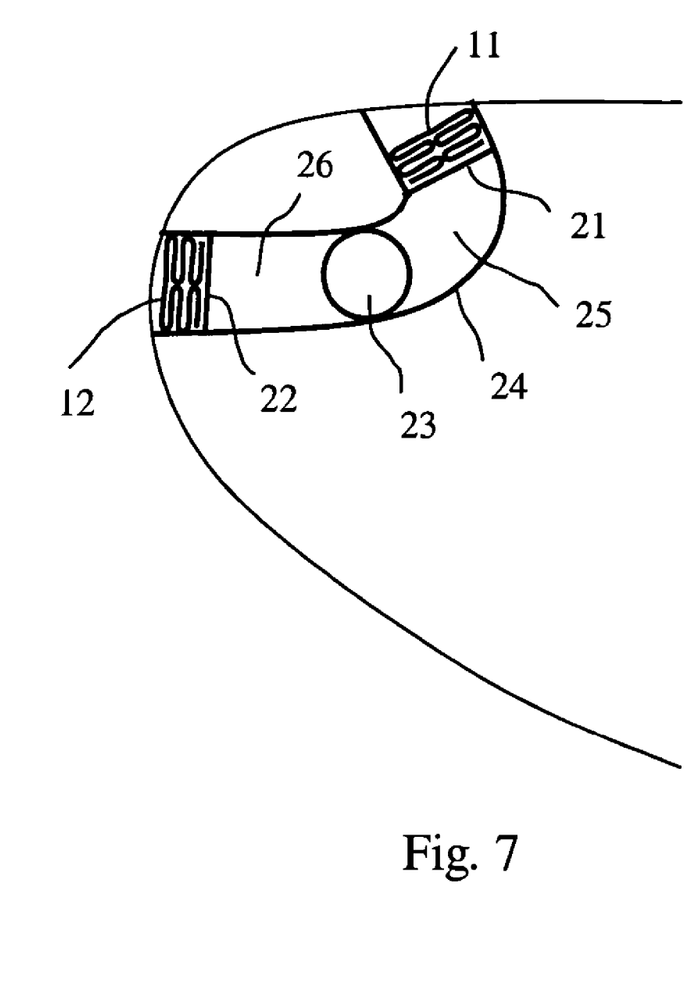
FIG. 7 is a cross sectional view of another embodiment of the present invention in which two airbag cushions share one inflator.

FIG. 7 shows another embodiment of the present invention, wherein one inflator 23 generates gas to inflate both the top-mounted 11 and mid-mounted airbags 12. The inflator 23 is disposed within a single conduit 24 that is in fluid communication with both airbags 11, 12. More specifically, the conduit 24 includes an upper portion coupled to the top-mounted airbag 11 and a lower portion coupled to the mid-mounted airbag 12. Preferably, the inflator 23 is positioned between the upper 25 and the lower 26 portions of the conduit 24. It should be appreciated that the inflator 23 can also be positioned at either end of the conduit 24, while remaining in fluid communication with both airbags 11, 12. Further, diffusers 21, 22 or different opening sizes of passages can be utilized between the inflator 23 and the airbags 11, 12 at any suitable point along the conduit 24 to control the amount and rate at which gas is supplied to each airbag 11, 12.

As will be clear to those of skill in the art, the herein described embodiments of the present invention may be altered in various ways without departing from the scope or teaching of the present invention. For example, an airbag system may be constructed with more than the two airbag modules described herein. As one example, a system with three airbag modules could be provided, each intended to follow along a generally common path to make direct contact with the occupant without substantial undesired upward or downward components of deployment. Also, while the airbag modules are shown as providing an upper or top-mounted airbag and a lower or mid-mounted airbag, two or more individual airbags may also be provided side-by-side in a transverse manner along the instrument panel, or at other angles therealong. Other variations will be clear to those of skill in the art. As such, the present disclosure should be interpreted broadly.

We claim:

1. A passenger airbag system for an automotive vehicle having a passenger compartment, a windshield, and an instrument panel disposed between the passenger compartment and windshield, the instrument panel having a top portion with a surface which is more horizontal than vertical and generally directed toward the windshield and a mid portion with a surface which is more vertical than horizontal and generally directed toward an occupant's torso in the passenger compartment, the passenger airbag system comprising:

a top-mounted airbag disposed in the top portion of the instrument panel and a mid-mounted airbag disposed in the mid portion of the instrument panel, both airbags being deployable through the instrument panel along a predetermined path for direct contact with an occupant seated in the passenger compartment, the predetermined path being substantially horizontal.

2. A passenger airbag system as set forth in claim 1, wherein the top-mounted airbag deploys both obliquely along the windshield and horizontally toward the occupant, the deployment substantially lacking a downward directional component relative to the occupant.

3. A passenger airbag system as set forth in claim 1, wherein the mid-mounted airbag deploys both along a horizontal and a downward path toward the occupant, the deployment substantially lacking an upward directional component relative to the occupant.

4. A passenger airbag system as set forth in claim 1, wherein the top-mounted airbag after deployment is presented between a top surface of the instrument panel, the windshield and the mid-mounted airbag for direct contact with the occupant.

5. A passenger airbag system as set forth in claim 4, wherein the mid-mounted airbag after deployment is presented below the top-mounted airbag for direct contact with the occupant.

6. A passenger airbag system as set forth in claim 1, wherein the top-mounted airbag after deployment has a volume substantially larger than that of the mid-mounted airbag.

7. A passenger airbag system as set forth in claim 6, wherein the top-mounted airbag after deployment has a volume at least 25 percent greater than the volume of the mid-mounted airbag after deployment.

8. A passenger airbag system as set forth in claim 6, wherein the top-mounted airbag after deployment has a volume at least 50 percent greater than the volume of the mid-mounted airbag after deployment.

9. A passenger airbag system as set forth in claim 6, wherein the top-mounted airbag after deployment has a volume ranging between 60 and 120 liters.

10. A passenger airbag system as set forth in claim 6, wherein the top-mounted airbag after deployment has a volume ranging between 30 and 70 liters.

11. A passenger airbag system as set forth in claim 1, wherein at least one inflator generates gas for deploying the top-mounted airbag and the mid-mounted airbag along the horizontal path.

12. A passenger airbag system as set forth in claim 11, wherein the at least one inflator is disposed in a single conduit in fluid communication with both the top-mounted and mid-mounted airbags.

13. A passenger airbag system as set forth in claim 12, wherein the single conduit includes an upper portion coupled with the top-mounted airbag and a lower portion coupled with the mid-mounted airbag, the at least one inflator being positioned between the upper and lower portions of the single conduit for inflating the top-mounted and mid-mounted airbags.

14. A passenger airbag system as set forth in claim 12, wherein the single conduit includes at least one diffuser for controlling the distribution of gases from the inflator between each of the top-mounted and mid-mounted airbags.

15. A passenger airbag system as set forth in claim 12, wherein the opening sizes of the upper and lower portions of the single conduit are different for controlling the distribution of gases from the inflator between each of the top-mounted and mid-mounted airbags.

16. A passenger airbag system as set forth in claim 1, wherein two inflators each inflate respective top-mounted and mid-mounted airbags.

17. A passenger airbag system as set forth in claim 16, wherein the firing times of the top-mounted airbag and the mid-mounted airbag are different in order to give sequential impacts into a rear facing child seat with a time delay.

18. A passenger airbag system as set forth in claim 16, wherein the mid-mounted airbag is deployed at a predetermined lower output level for any high speed crashes when it is determined that the occupant is restrained by a safety belt in the occupant compartment.

19. A passenger airbag system for an automotive vehicle having a passenger compartment, a windshield, and an instrument panel disposed between the passenger compartment and windshield, the instrument panel having a top portion with a surface which is more horizontal than vertical and generally directed toward the windshield and a mid portion with a surface which is more vertical than horizontal and generally directed toward an occupant's torso in the passenger compartment, the passenger airbag system comprising:

a top-mounted airbag disposed in the top portion of the instrument panel and a mid-mounted airbag disposed in the mid portion of the instrument panel, both airbags being deployable through the instrument panel for direct contact with an occupant seated in the passenger compartment, the top-mounted airbag having a volume after deployment that is substantially larger than the volume of the mid-mounted airbag after deployment.

20. A passenger airbag system as set forth in claim 19, wherein the top-mounted airbag after deployment has a volume at least 25 percent greater than the volume of the mid-mounted airbag after deployment.

21. A passenger airbag system as set forth in claim 19, wherein the top-mounted airbag after deployment has a volume at least 50 percent greater than the volume of the mid-mounted airbag after deployment.

22. A passenger airbag system as set forth in claim 19, wherein both airbags are deployable along a common predetermined path that is substantially horizontal.

23. A passenger airbag system as set forth in claim 22, wherein the top-mounted airbag deploys both obliquely along the windshield and horizontally toward the occupant, the deployment substantially lacking a downward directional component relative to the occupant.

24. A passenger airbag system as set forth in claim 22, wherein the mid-mounted airbag deploys both along a horizontal and a downward path toward the occupant, the deployment substantially lacking an upward directional component relative to the occupant.

25. A passenger airbag system as set forth in claim 19, wherein two inflators each inflate respective top-mounted and mid-mounted airbags.

26. A passenger airbag system as set forth in claim 25, wherein the mid-mounted airbag is deployed at a predetermined lower output level for any high speed crashes when it is determined that the occupant is restrained by a safety belt in the occupant compartment.

27. A passenger airbag system for an automotive vehicle having a passenger compartment, a windshield, and an instrument panel disposed between the passenger compartment and windshield, the passenger airbag system comprising:

an upper airbag and a lower airbag, both being deployable through the instrument panel for direct contact with an occupant seated in the passenger compartment, the deployment of the airbags during high speed crashes being controlled in accordance with an algorithm that defines a predetermined high output level for the deployment of the upper airbag and a predetermined low output level for the deployment of the lower airbag when it is determined that the occupant is restrained by a safety belt in the occupant compartment, the low output level being lower than the high output level.

28. A passenger airbag system as set forth in claim 27, the instrument panel having a top portion with a surface which is more horizontal than vertical and generally directed toward the windshield and a mid portion with a surface which is more vertical than horizontal and generally directed toward an occupant's torso in the passenger compartment;

wherein the upper airbag is disposed in the top portion of the instrument panel and the lower airbag is disposed in the mid portion of the instrument panel.

29. A passenger airbag system as set forth in claim 27, wherein the high speed crashes includes 64 km/h (40 mph) flat frontal rigid barrier tests.

30. A passenger airbag system as set forth in claim 27, wherein the predetermined low output level comprises not deploying the lower airbag.

* * * * *